US009544193B2

(12) United States Patent
Benny et al.

(10) Patent No.: US 9,544,193 B2
(45) Date of Patent: Jan. 10, 2017

(54) SYNCHRONIZING CONFIGURATIONS AMONGST MULTIPLE DEVICES

(71) Applicant: INTERNATIONAL BUSINESS MACHINES CORPORATION, Armonk, NY (US)

(72) Inventors: Stephan Benny, San Jose, CA (US); Amitabha Biswas, San Francisco, CA (US); Sisir Chowdhury, Fremont, CA (US); Jayakrishna Kidambi, San Jose, CA (US); Ryan D. Moats, Omaha, NE (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 14/044,795

(22) Filed: Oct. 2, 2013

(65) Prior Publication Data

US 2015/0095468 A1 Apr. 2, 2015

(51) Int. Cl.
*H04L 12/28* (2006.01)
*H04L 12/24* (2006.01)
*G06F 9/445* (2006.01)
*H04W 24/04* (2009.01)
*G06F 9/455* (2006.01)

(52) U.S. Cl.
CPC ....... *H04L 41/0853* (2013.01); *G06F 9/44505* (2013.01); *G06F 9/45558* (2013.01); *H04L 41/085* (2013.01); *H04W 24/04* (2013.01); *G06F 8/65* (2013.01); *H04L 41/0859* (2013.01)

(58) Field of Classification Search
USPC ... 717/170; 370/254; 1/1; 709/220; 379/342; 710/316; 707/999.1, 999.203
See application file for complete search history.

(56) References Cited

U.S. PATENT DOCUMENTS

| | | | |
|---|---|---|---|
| 6,128,656 A | 10/2000 | Matchefts et al. | |
| 6,449,624 B1* | 9/2002 | Hammack | G05B 19/0426 |
| 7,383,355 B1 | 6/2008 | Berkman et al. | |
| 7,467,372 B2 | 12/2008 | Loughlin et al. | |
| 7,600,003 B1 | 10/2009 | Bainbridge et al. | |
| 7,668,943 B2 | 2/2010 | Liu | |
| 7,949,744 B2 | 5/2011 | Kortright | |
| 8,027,272 B2* | 9/2011 | Ramachandran | H04W 24/04 370/254 |
| 8,037,164 B2 | 10/2011 | Draca et al. | |
| 2009/0144718 A1* | 6/2009 | Boggs | G06F 8/65 717/170 |
| 2011/0010700 A1* | 1/2011 | Lanner | G06F 9/44505 717/170 |
| 2012/0089710 A1 | 4/2012 | Boodman et al. | |

* cited by examiner

*Primary Examiner* — Kyung H Shin
(74) *Attorney, Agent, or Firm* — Matthew C. Zehrer

(57) ABSTRACT

A data handling network includes a management system and a plurality of devices in communication with the management system. Each device may operate under various configurations. The management system includes a configuration version table that includes a device identifier and an intended configuration version number. A configuration manager within a device queries the management system with a query that includes a device identifier and a current device operating configuration version number. The management system may interrogate the configuration version table to determine if the current device operating configuration version number is similar to the intended configuration version number.

20 Claims, 4 Drawing Sheets

| 112 | Configuration Version (12) | Table (14) | Key (16) |
|---|---|---|---|
| | 1 | Device | 1 | — 160
| | 2 | Virtual | 1000 | — 162
| | 3 | Virtual | 1001 | — 164
| | 4 | Device | 2 | — 166
| | 5 | Device | 3 | — 168
| | 6 | Virtual | 2000 | — 170

| 114 | Device ID (18) | Name (20) | ... | Version (22) | Configuration URI (24) |
|---|---|---|---|---|---|
| 160 | 1 | Pop | ... | 1 | /api/device/1/... |
| 166 | 2 | Soda | ... | 4 | /api/device/2/... |
| 168 | 3 | Tea | ... | 5 | /api/device/3/... |

| 116 | Virtual Machine ID (26) | Name (28) | ... | Version (30) | Configuration URI (32) |
|---|---|---|---|---|---|
| 162 | 1000 | Pop Sales | ... | 2 | /api/vm/1000/... |
| 164 | 1001 | Pop Retail | ... | 3 | /api/vm/1001/... |
| 170 | 2000 | Soda Sales | ... | 6 | /api/vm/2000/... |

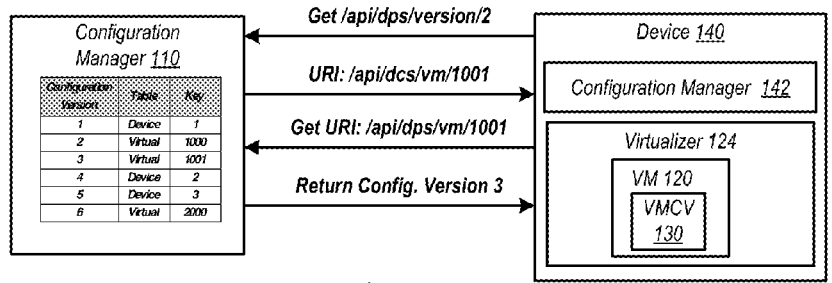
FIG. 5B
| | Virtual Machine ID | Name | ... | Version | State | Configuration URI |
|---|---|---|---|---|---|---|
| 116 | 1000 | Pop Sales | ... | 2 | To be Deleted | /api/vm/1000/... |
| | ... | ... | ... | ... | | ... |
| | ... | ... | ... | ... | | ... |
| | 1000 | Pop Sales | ... | 10 | Current | /api/vm/1000/... |
FIG. 6
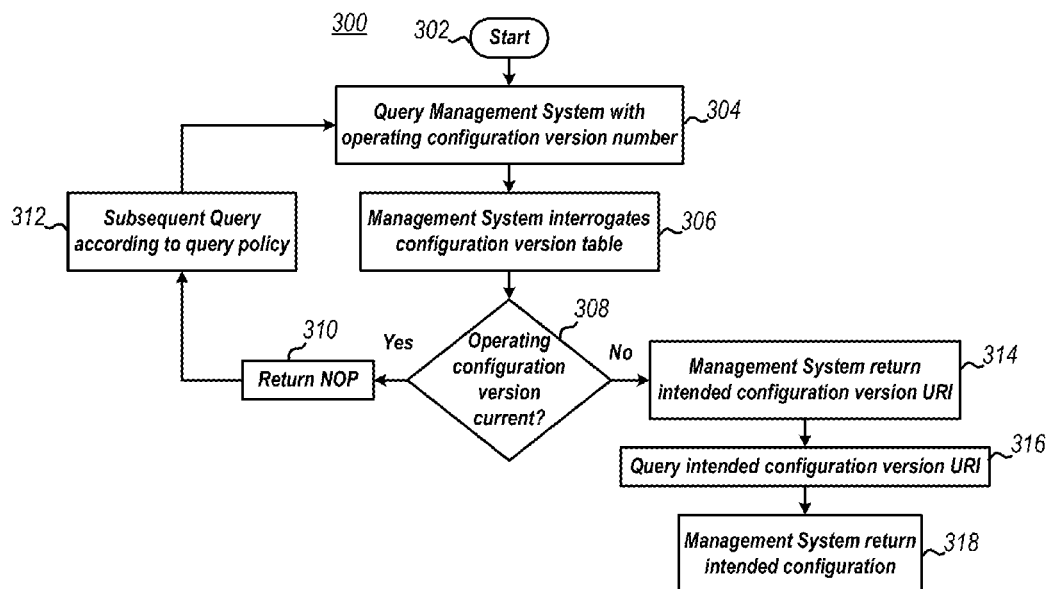
FIG. 7

SYNCHRONIZING CONFIGURATIONS AMONGST MULTIPLE DEVICES

FIELD

Embodiments of invention generally relate to device management systems, and more particularly to synchronizing configurations amongst multiple devices and/or multiple device types.

DESCRIPTION OF THE RELATED ART

Some electronic system environments utilize a central management station, such as a management console and/or a management user interface that allows a user to set operating configurations of various devices within the environment. Each device may operate as dictated by the configuration set at the management station. As the number of devices and as the variation of devices within the environment increase, so do the complexities of ensuring that each device operates under the proper configuration.

SUMMARY

Embodiments of invention generally relate to device management systems, and more particularly to synchronizing configurations amongst multiple devices and/or multiple device types.

In a first embodiment of the present invention, a data handling network includes a management system and a plurality of devices in communication with the management system. The management system includes a configuration version table that includes a device identifier and an intended configuration version number. A device includes a configuration manager that queries the management system, the query including a device identifier and a current operating configuration version number.

In another embodiment, a method for synchronizing device configuration includes the configuration manager querying the management system with a query that includes the device identifier and the current operating configuration version number. The management system interrogates the configuration version table to determine if the current operating configuration version number is similar to the intended configuration version number.

In another embodiment a computer program product for synchronizing device configuration includes a computer readable storage medium having program code embodied therewith, the program code executable to cause the configuration manager to query the management system and to cause the management system to interrogate the configuration version table to determine if the current operating configuration version number is similar to the intended configuration version number.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 depicts an exemplary configuration version table, according to various embodiments of the present invention.

FIG. 3 and FIG. 4 depict exemplary device object tables, according to various embodiments of the present invention.

FIG. 5A and FIG. 5B depict exemplary device configuration update schemes, according to various embodiments of the present invention.

FIG. 6 depicts an exemplary device object table, according to various embodiments of the present invention.

FIG. 7 depicts a block diagram of a device configuration update method, according to various embodiments of the present invention.

DETAILED DESCRIPTION

Figure 1:
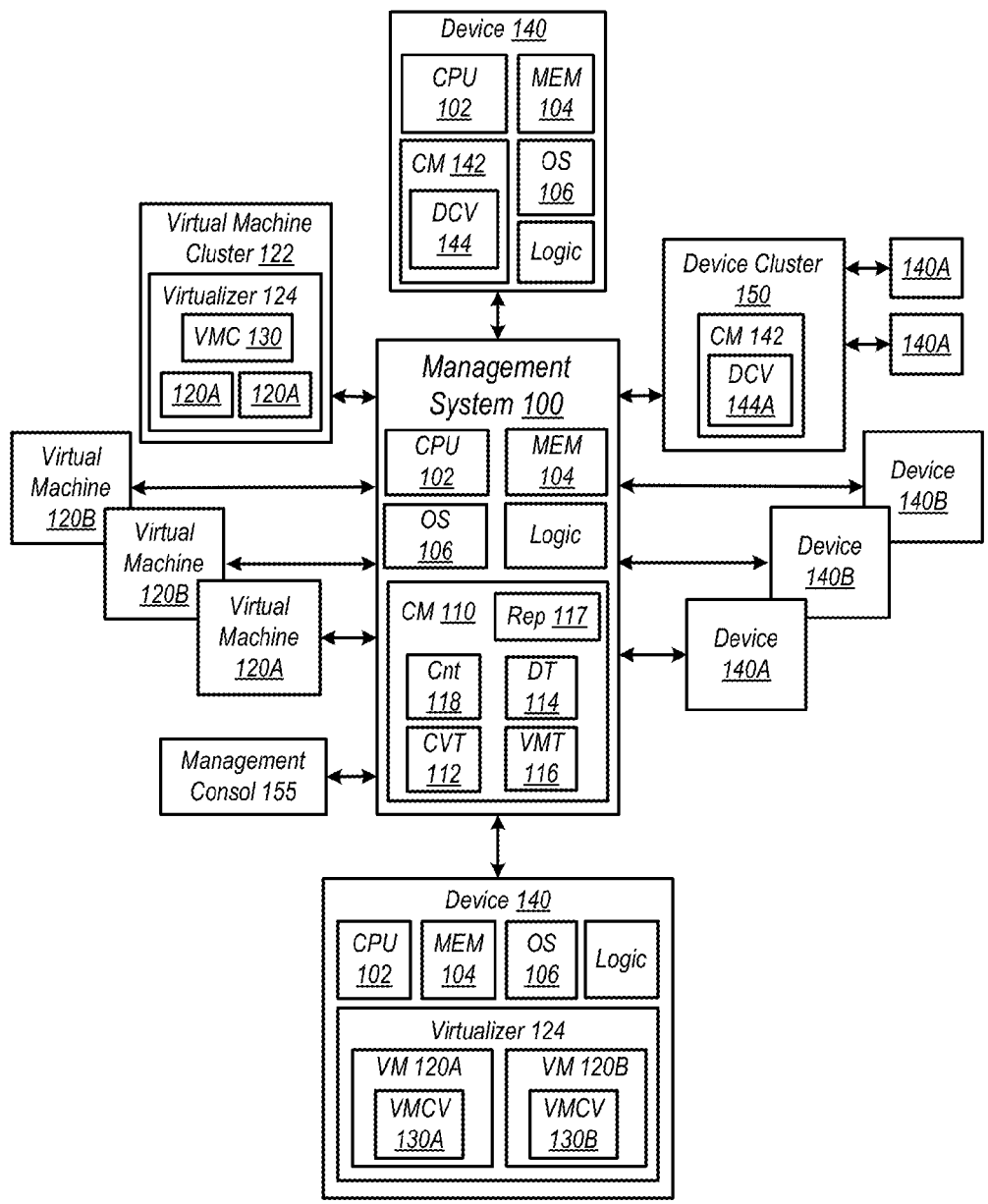
FIG. 1 depicts an electronic system environment, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "device," "manager" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The drawings are not necessarily to scale. The drawings are merely schematic representations, not intended to portray specific parameters of the invention. The drawings are intended to depict only exemplary embodiments of the invention. In the drawings, like numbering represents like elements.

FIG. 1 depicts a data handling network 10 that includes a management system 100 and various devices (e.g. device 140, virtual machine, 120, etc.) in communication therewith, according to various embodiments of the present invention. Management system 100 is a centralized management system that maintains device operation configuration information in accordance with the various embodiments described herein.

Management system 100 may include a central processing unit (CPU) 102, memory 104, operating software 106, logic, and configuration manager 110. The CPU 102 may be connected to memory 104 by a system bus (not shown). The CPU 102 may execute program instructions stored in memory 104. Although a single CPU 102 is shown, it should be understood that management system 100 may have multiple CPUs 102. Memory 104 may be included within CPU 102 or connected to it via the system bus. Memory 104 may be, for example, a random access semiconductor memory for storing data and/or program instructions, code, logic, etc. Though memory 104 is shown conceptually as a single monolithic entity, memory 104 may be arranged as a hierarchy of caches and other memory devices. In some instances, a hierarchy of cache memories are associated with each CPU 102. Memory 104 may include operating software 106. Operating software 106 may include an operating system that provides functions such as device drivers or interfaces, management of memory pages, management of multiple tasks, etc., as is known in the art. Operating software 106 may also include applications that may, for example, include a configuration management software application whereby a management system 100 network interface may interact with the various devices within network 10 to enable management system 100 to be a management server.

The system bus may support the transfer of data, commands, and other information between CPU 102 and peripheral or other devices attached to it, and communication of data which may occur between the external devices independent of CPU 102. The system bus may be structured as multiple buses which may be, for example, hierarchically arranged. In certain embodiments, the system bus may be connected to other management system 100 components (such as configuration manager 110, etc.) and/or to a myriad of devices through a connection hub, through an adapter, or directly via a network.

The system bus may be connected to an adapter (not shown) included in management system 100. The adapter may include adapter microcode or firmware and decision logic with at least one fast nonvolatile write cache, queues, interrupt registers, etc. The adapter may process incoming messages or process outgoing messages from/to other network 10 devices, respectively. The adapter may contain electronic components and logic to adapt or convert data of one protocol on one bus to another protocol on another bus. In certain embodiments various adapters are included within network 10 (e.g. within management system 100, within device 140, within device cluster 150, etc.). Therefore, the adapter may connect management system 100 to various devices using one or more protocols including, but not limited to, Token Ring, Gigabyte Ethernet, Ethernet, Fibre Channel, SSA, storage area network (SAN), Fiber Channel Arbitrated Loop (FCAL), Serial SCSI, Ultra3 SCSI, Infiniband, FDDI, ATM, 1394, ESCON, wireless relays, Twinax, LAN connections, WAN connections, etc.

In certain embodiments, the system bus may be directly connected to a network interface (not shown) that provides an operative connection for transmission of data or for receipt of data to/from network 10 devices. The network may be an internet but could also be any smaller self-contained network such as an intranet, a WAN, a LAN, or other internal or external network using; e.g., telephone transmission lines, cable services, satellites, fiber optics, T1 lines, wireless, etc.

In certain embodiments, management system 100 includes storage (not shown). Storage may be rotating magnetic disk storage, rotating or static optical drives, magnetic tape storage, FLASH memory, etc. In certain embodiments, storage is connected to CPU 102, memory 104, etc. via the system bus. In certain embodiments, management system 100 may include a user display, a keyboard, a mouse or other handheld device, etc. to allow a user to interface therewith to effectively instruct management system 100 of an intended device configuration. In other embodiments, a user may interface with another device (e.g. management console 155) that in turn communicates with management system 100 to effectively instruct management system 100 of an intended device configuration.

In certain embodiments, management system 100 may include a configuration manager 110. Configuration manager 110 may be a hardware component such as a field programmable gate array (FPGA) or application specific integrated circuit (ASIC) connected to CPU 102 and memory 104 via the system bus, or it may be a software component or logic module, such as an operating software 106 application. Still, in certain embodiments, the functionality or features of configuration manager 110 may be implemented by CPU 102 in conjunction with memory 104, operating software 106, logic, etc. In accordance with various embodiments further disclosed herein, configuration manager 110 maintains configuration information for one or more devices in network 10. In certain embodiments, to effectively maintain device configuration information, configuration manager 110 may include a configuration version table 112, a device object table 114, a virtual machine object table 116, counter 118, and/or repository 117.

In certain embodiments, management system 100 may be a computer, a server, an appliance-like client device, a thin client, a terminal-like device, etc. The convergence of computing, telecommunications and consumer electronics is causing a tremendous growth in the number and variety of mobile devices as clients. This mobile architecture enables the multitude of clients including laptops, sub-notebooks, handheld computers such as such as smartphones, etc. Thus, depending upon the implemented management system 100, its adapter(s) and network interfaces may support a variety of user interfaces including traditional keyboard and mouse interfaces, display, pen, touch screens, speech recognition, text-to-speech, etc.

The management system 100 shown in FIG. 1 is intended to be a simplified representation, it being understood that many variations in system implementation are possible in addition to those specifically mentioned here. While management system 100 could conceivably be a personal computer system, management system 100 may also be a larger computer system such as a general purpose server or may be a smaller data handling device such as a mobile client. Though management system 100 and its components are shown and described in FIG. 1 above as a more or less single, self-contained system(s), it is alternatively intended that management system 100 and its components may be made up of multiple modular systems that share one or more resources, etc.

In certain embodiments, network 10 also includes one or more devices 140 and/or one or more virtual machines 120 in communication with management system 100. A device 140 may be any physical data handling device that may operate under various configurations. A virtual machine 120 is an emulated physical data handling device that may operate under various configurations.

Device 140 may include a CPU 102, memory 104, operating software 106, logic, etc. along with other similar components as management system 100 and/or additional device 140 specific components. In certain embodiments, device 140 includes a configuration manager 142 that implements an operating configuration of device 140. Depending on the type of device 140, configuration manager 142 may be a hardware component such as a FPGA or ASIC connected to device 140 CPU 102 and memory 104 via a system bus, or it may be a software component or logic module, such as an operating software 106 application. Still, in certain embodiments, the functionality or features of configuration manager 142 may be implemented by device 140 CPU 102, memory 104, operating software 106, logic, etc. In accordance with various embodiments further disclosed herein, configuration manager 142 queries management system 100 to determine if device 140 is operating under an intended, proper, and/or a most recent configuration. In certain embodiments, to effectively determine if device 140 is operating under the intended, proper, and/or most recent configuration, configuration manager 142 may include a device configuration version 144. Configuration manager 142 may determine if a current device configuration version 144 is similar to the intended, proper, and/or a most recent configuration. If the configuration version is not similar, configuration manager 144 queries management system 100 for the intended, proper, and/or a most recent configuration. In turn, management system 100 communicates the intended, proper, and/or a most recent configuration to configuration manager 142. Configuration manager 142 may implement the intended, proper, and/or a most recent configuration within device 140 and may update device configuration version 144 to the version number associated with the intended, proper, and/or a most recent configuration.

In certain implementations, device 140 may be connected directly to management system 100. However, in other implementations, multiple devices 140 may be indirectly connected to management system 100 via an intermediary device or manager, such as a device cluster manager 150. Similar devices (i.e. 140A, 140A, etc.) may be within a device cluster manager 150, or dissimilar virtual machines (i.e. 140A, 140B, etc.) may be within a device cluster. Similar devices 140 may share similar device configuration versions 144 (e.g. 144A, etc.) or dissimilar device configuration versions 144 (e.g. 144A, 144B, etc.). In certain embodiments, the device configuration version 144 may be individually managed by each device 140. In other embodiments, device configuration version 144 may be managed at a higher level (e.g. device cluster manager 150, etc.). For example, device cluster manager 150 manages a shared device configuration version 144A for devices 140A and 140A.

A virtual machine 120 is an emulated physical data handling device that may operate under various configurations. A virtual machine 120 may be emulated by emulation software running on a physical device CPU 102, memory 104, etc. In certain embodiments, virtual machine 120 is emulated by a virtualizer 124. Virtualizer 124 may be a hypervisor, managing logical partition, or any similar virtualization manager.

In certain embodiments, virtualizer 124 implements an operating configuration of virtual machine 120. Therefore, in accordance with various embodiments further disclosed herein, virtualizer 124 may query management system 100 to determine if virtual machine 120 is operating under an intended, proper, and/or a most recent configuration. In certain embodiments, to effectively determine if virtual machine 120 is operating under the intended, proper, and/or most recent configuration, virtualizer 124 may include a virtual machine configuration version 130. Virtualizer 124 may determine if a current virtual machine configuration version 130 is similar to the intended, proper, and/or a most recent configuration. If the configuration version is not similar, virtualizer 124 queries management system 100 for the intended, proper, and/or a most recent configuration. In turn, management system 100 communicates the intended, proper, and/or a most recent configuration to virtualizer 124. Virtualizer 124 may implement the intended, proper, and/or a most recent configuration within virtual machine 120 and may update virtual machine configuration version 130 to the version number associated with the intended, proper, and/or a most recent configuration. Still, in certain other embodiments, virtualizer 124 works in conjunction with configuration manager 110 to implement an operating configuration of virtual machine 120.

In certain implementations, a single virtual machine 120 may be emulated within a single physical device. However, in other implementations, multiple virtual machines 120 may be emulated within a physical device. Similar virtual machines (i.e. 120A, 120A, etc.) may be emulated within a physical device, or dissimilar virtual machines (i.e. 120A, 120B, etc.) may be emulated within a physical device. When a plurality of similar virtual machines 120 are emulated, they may be referred to as a virtual machine cluster 122. Similar virtual machines 120 typically share similar virtual machine configuration versions 130. In certain embodiments, the virtual machine configuration version 130 may be individually managed by each virtual machine 120. For example, virtual machine 120A manages virtual machine configuration version 130A and virtual machine 120B manages virtual machine configuration version 130B, etc. In other embodiments, the virtual machine configuration version 130 may be managed at a higher level (e.g. virtualizer 124, etc.). For example, virtualizer 124 manages a shared virtual machine configuration version 130 for virtual machines 120A and 120B.

The network 10 shown in FIG. 1 is intended to be a simplified representation, it being understood that many variations in network 10 implementation are possible in addition to those specifically mentioned herein.

Figures 2, 3, 4, 5A:
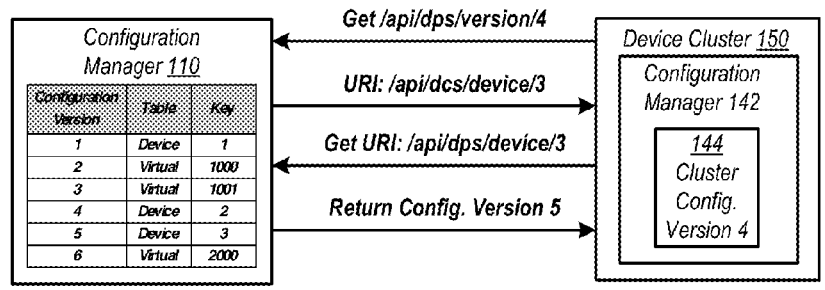

FIG. 2 depicts an exemplary configuration version table 112, according to various embodiments of the present invention. According to various embodiments of the present invention, management system 100 receives configuration information via a user interface. The information instructs management system 100 of an intended configuration of a particular device 140, group of devices 140, particular virtual machine 120, and/or group of virtual machines 120. For example, the configuration information instructs that device 140A should operate under a particular configuration. Each instruction identifies at least one device (virtual machine 120, device 140, etc.) and the intended operation configuration thereof. In certain embodiments, the configuration information associated with the intended configuration may be stored by configuration manager 110 in repository 117. In certain embodiments, every configuration is associated with a version number. When a new operation configuration is received by management system 100 a new configuration version number is assigned. For example, each new intended configuration receives an incremented configuration version number. In certain embodiments, management system 100 includes a counter 118 (e.g. 64 bit counter, etc.) to generate configuration version numbers.

In certain embodiments, management system 100 includes a configuration version table 112 that associates the intended, proper, and/or most recent configuration operating configuration version number (i.e. COL. 12) with one or more devices (virtual machine 120, device 140, etc.) that should implement the operation configuration associated therewith (i.e. COL. 16). For example, device "1" should implement the configuration associated with configuration version "1," virtual machine "2000" should implement the configuration associated with configuration version "6," etc. Configuration version table 112 may also include an object table entry (i.e. COL. 14) that associates the device (virtual machine 120, device 140, etc.) with its respective device object table 114, virtual machine object table 116, etc. In certain embodiments, one or more of the configuration version table 112 row entries may point to an associated row in a respective device object table 114, virtual machine object table 116, etc. For example, one or more of row entries 160, 162, 164, 166, 168, 170 may point to associated row entries 160, 162, 164, 166, 168, 170 of virtual machine object table 116 or device object table 114, respectively.

FIG. 3 depicts an exemplary device object table 114, according to various embodiments of the present invention. Device object table 114 includes at least configuration path entries (COL. 24). In certain embodiments, device object table 114 also includes the intended, proper, and/or most recent configuration operating configuration version number (i.e. COL. 22) and/or one or more devices 140 that should implement the operation configuration associated therewith (i.e. COL. 18). In certain embodiments, device object table 114 also includes other entries, such as device name (COL. 20), etc. Configuration path 24 is generally a pointer for device 140 to retrieve associated configuration information associated with the intended, proper, and/or most recent configuration version number. In certain embodiments, configuration manager 142 follows configuration path 24 to effectively retrieve configuration information so as to implement the intended, proper, and/or most recent configuration in device 140. In certain embodiments, one or more of row entries 160, 166, and/or 168 may point to associated row entries 160, 166, and/or 168 of configuration version table 112 to effectively associate configuration path 24 with device 140, etc.

FIG. 4 depicts an exemplary virtual machine object table 116, according to various embodiments of the present invention. Virtual machine object table 116 includes at least configuration path entries (COL. 32). In certain embodiments, virtual machine object table 116 also includes the intended, proper, and/or most recent configuration operating configuration version number (i.e. COL. 30) and/or one or more virtual machines 120 that should implement the operation configuration associated therewith (i.e. COL. 26). In certain embodiments, virtual machine object table 116 also includes other entries, such as device name (COL. 28), etc. Configuration path 32 is generally a pointer for virtual machine 120 to retrieve associated configuration information associated with the intended, proper, and/or most recent configuration version number. In certain embodiments, virtualizer 124 follows configuration path 32 to effectively retrieve configuration information so as to implement the intended, proper, and/or most recent configuration. In certain embodiments, configuration manager 142 of the device 140 associated with virtual machine 120 follows configuration path 32 to effectively retrieve configuration information so as to implement the intended, proper, and/or most recent configuration. In other embodiments, configuration manager 142 and virtualizer 124 work in tandem to follow configuration path 32 to effectively retrieve configuration information. In certain embodiments, one or more of row entries 162, 164, and/or 170 may point to associated row entries 162, 164, and/or 170 of configuration version table 112 to effectively associate configuration path 32 with virtual machine 120, etc.

FIG. 5A depicts an exemplary device 140 configuration update scheme, according to various embodiments of the present invention. A device cluster manager 150 may be managing or controlling one or more devices 140 currently operating with a configuration associated with a configuration version 144. According to certain embodiments, configuration manager 142 within device cluster 150 and/or within device(s) 140 queries configuration manager 110 within management system 100 according to a query scheme. The query scheme generally indicates the frequency of configuration manager 142 querying. In one embodiment, the frequency of querying is determined by configuration manager 142. Typically configuration manager 142 will continuously monitor and retain all available and relevant configuration information. Configuration manager 142 may pause after there is no configuration information to retain. Subsequently, configuration manager 140 will query at frequency to see if there are new configuration to pick up. The query scheme may be time dependent, event dependent, predetermined, etc. Configuration manager 142 may query management system 100 with its current configuration version 144. In certain embodiments, the query may also include an identifier for the device 140, device cluster 150, etc.

In certain embodiments, configuration manager 110 receives the query. Configuration manager 110 determines whether the querying device 140 is operating under the intended, proper, and/or most recent configuration. In certain embodiments, configuration manager 110 determines the particular querying device 140 via the identifier. Configuration manager 110 may query configuration version table 112 to determine if the querying device 140 is operating under the intended, proper, and/or most recent configuration by comparing configuration version 144 with the intended, proper, and/or most recent configuration version number in configuration version table 112. If the values are similar, then the querying device 140 is operating in the intended, proper, and/or most recent configuration and configuration manager 110 may return instructions to configuration manger 142 that no further action is needed.

However, if the values differ, the querying device 140 is not operating in the intended, proper, and/or most recent configuration. Configuration manager 110 may interrogate device object table 114 to determine the configuration path 24 to the proper configuration information within repository 117. Configuration manager 110 then responds to configuration manager 142 with the proper configuration path 24. Configuration manager 142 may again query managing device 100 with the proper configuration path 24. Managing device 100 then returns the configuration information within repository 117 according to the queried configuration path 24. Once the configuration information is received, configuration manager 142 may implement the intended, proper, and/or most recent configuration of device 140.

For example, as shown in FIG. 5A, device 3 queries managing system 100 indicating it is device 3 and its operating with a configuration associated with configuration version 4. Managing system 100, consulting configuration version table 112, determines that device 3 should be operating with a configuration associated with version 5. Managing system 100, consulting device object table 114, returns the configuration path /api/device/3 path 24 associated with version 5. Device 3 again queries managing system 100 with the /api/device/3 path 24 associated with version 5. Managing device 100 returns the configuration information according to the /api/device/3 path 24. Configuration manager 142 then implements the configuration information received to cause device 3 to operate with the intended, proper, and/or most recent configuration.

FIG. 5B depicts an exemplary virtual machine 120 configuration update scheme, according to various embodiments of the present invention. A virtualizer 124 may be emulating or controlling one or more virtual machines 120 currently operating with a configuration associated with a configuration version 130. According to certain embodiments, configuration manager 142 and/or virtualizer 124 queries management system 100 according to the query scheme. Configuration manager 142 and/or virtualizer 124 may query management system 100 with a current virtual machine configuration version 130. In certain embodiments, the query may also include an identifier for the virtual machine 120, virtual machine cluster 122, etc.

In certain embodiments, configuration manager 110 receives the query. Configuration manager 110 determines whether the one or more virtual machines 120 associated with the query is operating under the intended, proper, and/or most recent configuration. In certain embodiments, configuration manager 110 determines the querying virtual machine via the identifier. Configuration manager 110 may query configuration version table 112 to determine if the querying virtual machine 120 is operating under the intended, proper, and/or most recent configuration by comparing configuration version 130 with the intended, proper, and/or most recent configuration version number in configuration version table 112. If the values are similar, then the querying virtual machine 120 is operating in the intended, proper, and/or most recent configuration and configuration manager 110 may return instructions to configuration manger 142 and/or virtualizer 124 that no further action is needed.

However, if the values differ, the querying virtual machine 120 is not operating in the intended, proper, and/or most recent configuration. Configuration manager 110 may interrogate virtual machine object table 116 to determine the configuration path 32 to the proper configuration information within repository 117. Configuration manager 110 then responds to configuration manager 142 with the proper configuration path 32. Configuration manager 142 and/or virtualizer 124 may again query managing device 100 with the proper configuration path 32. Managing device 100 then returns the configuration information within repository 117 according to the queried configuration path 32. Once the configuration information is received, configuration manager 142 and/or virtualizer 124 may implement the intended, proper, and/or most recent configuration of virtual machine 120.

For example, as shown in FIG. 5B, virtual machine 1001 queries managing system 100 indicating it is virtual machine 1001 and its operating with a configuration associated with configuration version 2. Managing system 100, consulting configuration version table 112, determines that virtual machine 1001 should be operating with a configuration associated with version 3. Managing system 100, consulting virtual machine object table 116, returns the configuration path /api/vm/1001 path 32 associated with version 3. Virtual machine 1001 again queries managing system 100 with the /api/vm/1001 path 32 associated with version 3. Managing device 100 returns the configuration information according to the /api/vm/1001 path 32. Configuration manager 142 and/or virtualizer 124 then implements the configuration information received to cause virtual machine 1001 to operate with the intended, proper, and/or most recent configuration.

FIG. 6 depicts an exemplary virtual machine object table 116, according to various embodiments of the present invention. In certain embodiments, virtual machine object table 116 and/or device object table 114 may include one or more configuration state entries (COL 34). Configuration state entries may indicate the status of the configuration associated there with. In certain embodiments, the status may be used for object table maintenance as is further described herein. For example, a new configuration version 10 associated with a virtual machine cluster 1000 may be received by management system 100.

Upon receiving the new configuration version 10, configuration manager 110 may determine if any prior configuration versions are associated with a similar device or device cluster. If there is a similar device or similar device cluster, a status entry is added to the field associated with the previous version. For example, configuration manager 110 determines that the same cluster 1000 was previously associated with configuration version 2 and adds a "to be deleted" entry in status field 34.

However, one or more virtual machines 120 within cluster 1000 may still be operating in a configuration associated with configuration version 2. Therefore, one or more entries associated with version 2 are not deleted until all of the virtual machines 120 within cluster 1000 have queried management system 100 according to the various embodiments of the present invention to obtain the new configuration information so as to operate in the intended, proper, and/or most recent configuration. Upon when all of the virtual machines 120 are operating in the intended, proper, and/or most recent configuration, configuration manager 110 then may delete one or more of the entries associated with configuration version 2.

In certain embodiments, the user may simply desire to delete a configuration associated with one or more devices without including a new operating configuration. In this circumstance, configuration manager 110 assigns a new configuration version and associates it with a null configuration set within repository 117. The devices associated with the new configuration version are updated (e.g. configuration manager 142 implements the null configuration set, thereby removing the previous operating configuration of the associated device, etc.) and the object tables are maintained in accordance with the various embodiments described herein.

FIG. 7 depicts a block diagram of a device configuration update method 300, according to various embodiments of the present invention. In certain embodiments, various devices 140 and/or virtual machines 120 may utilize method 300 to update and/or synchronize operation configurations. Method 300 begins at block 302 and begins with configuration manager 142 and/or virtualizer 124 querying management system 100 with an operating configuration version number (block 304). The version number may be a device configuration version 144, a virtual machine configuration version 130, may represent a single device 140 or a single virtual machine 120, and/or may represent a group of devices 140 or a group of virtual machines 120, etc. In certain embodiments, the query also includes a querying device ID.

Method 300 continues with management system 100 interrogating configuration version table 112 to determine if the configuration version included in the query is similar to the configuration version associated with the device ID within configuration version table 112 (block 306). If the configuration version numbers are similar, the querying device is operating under a current configuration (block 308) and the management system 100 returns instructions indicating no further action is required to the querying device (block 310). The querying device may subsequently query management system 100 according to a query policy (block 312). For example, the querying device may again query management system 100 after a threshold time.

If the configuration version numbers are not similar, the querying device is not operating under a current configuration (block 308), and the management system 100 returns a configuration information path associated with the current configuration (block 314). The querying device again queries management system 100 with the configuration information path associated with the current configuration (block 316). Management system 100 returns the configuration information associated with the current configuration to the querying device (block 318). The querying device may implement the configuration information to operate under the current configuration. Method 300 ends at block 320.

Figure 8:
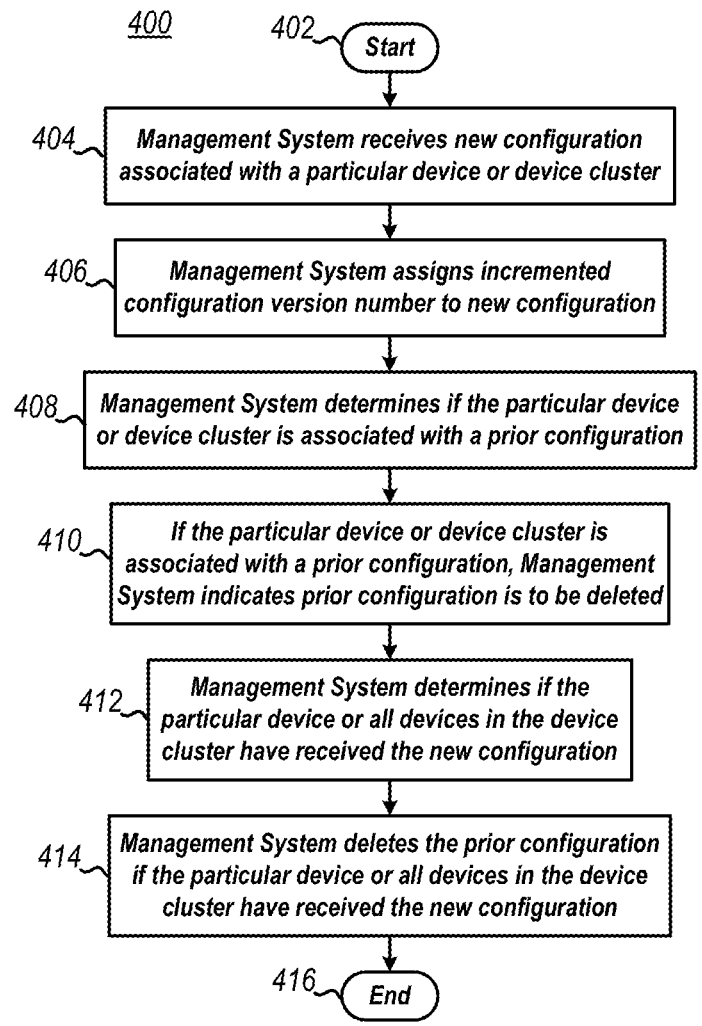
FIG. 8 depicts a block diagram of a device object table revision method, according to various embodiments of the present invention.

FIG. 8 depicts a block diagram of a device object table revision method 400, according to various embodiments of the present invention. In certain embodiments, management system 100 may utilize method 400 to maintain configuration version table 112. Method 400 begins at block 402 and continues with management system 100 receiving a new intended configuration associated with one or more particular devices or one or more groups of devices (block 404). For example, management system 100 receives an intended configuration via management console 155 subsequent to a user setting the configuration there upon.

Method 400 continues with management system 100 assigning an incremented configuration version number to the new configuration (block 406). For example, if a previous configuration version assigned was version number 704, management system 100 may assign 705 to the new configuration. Management system 100 determines whether one or more particular devices or one or more groups of devices was previously associated with a prior configuration and/or a prior configuration version number (block 408). If one or more particular devices or one or more groups of devices is associated with a prior configuration and/or a prior configuration version number, management system 100 indicates the prior configuration is to be deleted within configuration version table 112 (block 410). For example, management system 100 adds a "to be deleted" indication in an associated configuration state entry 34.

Method 400 continues with management system 100 determining if the one or more particular devices or one or more groups of devices have received and/or implemented the new configuration (block 412). If the one or more particular devices or one or more groups of devices have received and/or implemented the new configuration, management system 100 deletes the prior configuration entries within configuration version table 112 (block 414). Method 400 ends at block 416.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A data handling network comprising:
  a management system (MS) comprising:
    a MS processor,
    a MS memory,
    a configuration version table (CVT) comprising a device identifier and an intended configuration version number, the intended configuration version number designating a proper operational configuration of a device associated with the device identifier,
    a user interface to receive updated intended configuration information associated with the device,
    a repository that stores the updated intended configuration information, and;
    a counter that increments the intended configuration version number in the CVT in response to receiving the updated intended configuration information, and;
  a plurality of devices in communication with the management system, each device comprising:
    a device processor,
    a device memory,
    a configuration manager that queries the management system, the query comprising a device identifier of a querying device and a current operating configuration version number of the querying device, the current operating configuration version number designating a current operational configuration the querying device;
  wherein the MS receives the configuration manager query and returns to the configuration manager a path to the updated intended configuration information in the repository if the intended configuration version number is dissimilar to the current operating configuration version number;
  wherein the configuration manager queries the management system with the path to the updated intended configuration information in the repository to obtain the intended configuration information; and
  wherein the MS is a centralized management system that maintains operation configurations of the plurality of devices by comprising a single CVT within the data handling network.

2. The data handling network of claim 1 wherein the management system further comprises:
  a device object table comprising a configuration path.

3. The data handling network of claim 2 wherein the device object table further comprises a configuration state.

4. The data handling network of claim 1 wherein the management system further comprises:
  a virtual machine object table comprising a configuration path.

5. The data handling network of claim 4 wherein the virtual machine object table further comprises a configuration state.

6. The data handling network of claim 1 wherein the plurality of comprises at least one physical device and at least one virtual machine.

7. The data handling network of claim 1 wherein the configuration manager implements the intended configuration information thereby causing the querying device to operate under the intended configuration.

8. The data handling network of claim 1 wherein the management system determines if the device identifier is associated with a prior configuration version number.

9. The data handling network of claim 8 wherein the management system indicates that the prior configuration version number should be deleted from the CVT if the determination is affirmative.

10. The data handling network of claim 9 wherein the management system deletes the prior configuration version number from the CVT only after a particular device associated the device identifier is operating under a current operating configuration associated with the current operating configuration version number.

11. The data handling network of claim 1, wherein the configuration manager is an application specific integrated circuit (ASIC).

12. The data handling network of claim 1, wherein the configuration manager is a field programmable gate array (FPGA).

13. A method for synchronizing device configuration comprising:
  querying, with a configuration manager, a management system (MS), the query comprising a device identifier and a current operating configuration version number, the current operating configuration version number designating a current operational configuration of the querying device, the querying device comprising the configuration manager, a device processor, and a device memory;
  interrogating, with the (MS), a configuration version table (CVT) comprising a querying device identifier and an intended configuration version number to determine if the current operating configuration version number is the same as the intended configuration version number, the intended configuration version number designating a proper operational configuration of the querying device, the MS comprising: a MS processor, a MS memory, a user interface to receive updated intended configuration information associated with the querying device, a repository that stores the updated intended configuration information, and a counter that increments the intended configuration version number in the CVT in response to receiving the updated intended configuration information, wherein the MS is a centralized MS in a data handling network comprising the MS and a plurality of devices in communication with the MS in which the MS maintains operation configurations of the plurality of devices by comprising a single CVT within the data handling network;

returning, with the MS to the configuration manager, a path to the updated intended configuration information in the repository if the intended configuration version number is dissimilar to the current operating configuration version number; and subsequent to returning the path to the updated intended configuration information in the repository, querying, with the configuration manager, the MS with the path to the updated intended configuration information in the repository to obtain the intended configuration information.

14. The method of claim 13 further comprising:
returning, with the MS, the updated intended configuration information to the configuration manager, and;
implementing, with the configuration manager, the updated intended configuration information to cause the querying device to operate under the proper operational configuration.

15. The method of claim 13, wherein the configuration manager is an application specific integrated circuit (ASIC).

16. The method of claim 13, wherein the configuration manager is a field programmable gate array (FPGA).

17. A computer program product for synchronizing device configuration, the computer program product comprising a non-transitory computer readable storage medium having program code embodied therewith, the program code executable to:

cause a configuration manager to query a management system (MS), the query comprising a device identifier and a current operating configuration version number, the current operating configuration version number designating a current operational configuration of the querying device, the querying device comprising the configuration manager, a device processor, and a device memory;

cause the MS to interrogate a configuration version table (CVT) comprising a querying device identifier and an intended configuration version number to determine if the current operating configuration version number is the same as the intended configuration version number, the intended configuration version number designating a proper operational configuration of the querying device, the MS comprising: a MS processor, a MS memory, a user interface to receive updated intended configuration information associated with the querying device, a repository that stores the updated intended configuration information, and a counter that increments the intended configuration version number in the CVT in response to receiving the updated intended configuration information, wherein the MS is a centralized MS in a data handling network comprising the MS and a plurality of devices in communication with the MS in which the MS maintains operation configurations of the plurality of devices by comprising a single CVT within the data handling network;

returning, with the MS to the configuration manager, a path to the updated intended configuration information in the repository if the intended configuration version number is dissimilar to the current operating configuration version number; and subsequent to returning the path to the updated intended configuration information in the repository, querying, with the configuration manager, the MS with the path to the updated intended configuration information in the repository to obtain the intended configuration information.

18. The computer program product of claim 17 wherein the program code if further executable to:
cause the (MS) to return the updated intended configuration information to the configuration manager, and;
cause the configuration manager to implement the updated intended configuration information thereby causing the querying device to operate under the proper operational configuration.

19. The computer program product of claim 17, wherein the configuration manager is an application specific integrated circuit (ASIC).

20. The computer program product of claim 17, wherein the configuration manager is a field programmable gate array (FPGA).

* * * * *